(12) United States Patent
Keiter et al.

(10) Patent No.: US 11,386,902 B2
(45) Date of Patent: Jul. 12, 2022

(54) SYSTEM FOR GENERATION AND MAINTENANCE OF VERIFIED DATA RECORDS

(71) Applicant: BANK OF AMERICA CORPORATION, Charlotte, NC (US)

(72) Inventors: Kelly Renee-Drop Keiter, Waxhaw, NC (US); Christopher Daniel Birch, Dayton, OH (US); Susan R. Hart, Addison, TX (US); Lisa Matthews, Charlotte, NC (US); Cody Dean Searl, Pineville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 234 days.

(21) Appl. No.: 16/860,950

(22) Filed: Apr. 28, 2020

(65) Prior Publication Data
US 2021/0335366 A1    Oct. 28, 2021

(51) Int. Cl.
| | |
|---|---|
| *G06F 40/211* | (2020.01) |
| *G10L 15/26* | (2006.01) |
| *G06F 40/30* | (2020.01) |
| *G06N 20/00* | (2019.01) |
| *G06F 16/951* | (2019.01) |
| *G06F 40/226* | (2020.01) |
| *G06F 40/205* | (2020.01) |

(52) U.S. Cl.
CPC ............ *G10L 15/26* (2013.01); *G06F 16/951* (2019.01); *G06F 40/226* (2020.01); *G06F 40/30* (2020.01); *G06N 20/00* (2019.01); *G06F 40/205* (2020.01); *G06F 40/211* (2020.01)

(58) Field of Classification Search
CPC ....... G06F 40/211; G06F 40/205; G10L 15/26
See application file for complete search history.

(56) References Cited

U.S. PATENT DOCUMENTS

| | | | |
|---|---|---|---|
| 5,960,384 A | * | 9/1999 | Brash ................... G06F 40/205 704/235 |
| 7,499,888 B1 | | 3/2009 | Tu et al. |
| 7,566,002 B2 | | 7/2009 | Love et al. |
| 7,610,216 B1 | | 10/2009 | May et al. |
| 8,160,935 B2 | | 4/2012 | Bui |
| 8,285,656 B1 | | 10/2012 | Chang et al. |
| 9,177,053 B2 | | 11/2015 | Myslinski |
| 9,189,772 B2 | | 11/2015 | Levit |

(Continued)

FOREIGN PATENT DOCUMENTS

CN      1226327 A * 8/1999    ........... G06F 17/271

*Primary Examiner* — Feng-Tzer Tzeng
(74) *Attorney, Agent, or Firm* — Moore & Van Allen PLLC; Nicholas C. Russell

(57) ABSTRACT

Embodiments of the present invention provide systems and methods for generation and maintenance of verified data records. The system may receive a data submission from a user device over one or more communication channels and convert the data submission into a normalized text format for processing and analysis. The data submission may then be analyzed using one or more trained machined learning models in order to identify factual statements and modifiers within the data submission, and generate a confidence score of verified factual information based on corroboration with one or more additional data sources. Additionally, identified modifiers may be analyzed to determine positive or negative sentiment.

17 Claims, 4 Drawing Sheets

(56) References Cited

U.S. PATENT DOCUMENTS

| | | |
|---|---|---|
| 9,483,159 B2 | 11/2016 | Myslinski |
| 9,972,055 B2 | 5/2018 | Myslinski |
| 10,333,934 B1 | 6/2019 | Fox et al. |
| 2003/0167266 A1* | 9/2003 | Saldanha ............... G06F 40/131 |
| 2006/0010487 A1 | 1/2006 | Fierer et al. |
| 2009/0138262 A1* | 5/2009 | Agarwal ................ G06F 16/68 |
| | | 704/235 |
| 2011/0276479 A1 | 11/2011 | Thomas |
| 2013/0297398 A1 | 11/2013 | Brown et al. |
| 2014/0164083 A1 | 6/2014 | Wilkes |
| 2014/0188461 A1 | 7/2014 | Myslinski |
| 2014/0236578 A1* | 8/2014 | Malon ..................... G06F 40/30 |
| | | 704/9 |
| 2016/0063053 A1 | 3/2016 | Myslinski |
| 2017/0337602 A1 | 11/2017 | Davis |
| 2017/0345009 A1 | 11/2017 | Unnerstall |
| 2018/0075437 A1 | 3/2018 | Snyder et al. |
| 2019/0114643 A1 | 4/2019 | Dewitt et al. |

\* cited by examiner

SYSTEM FOR GENERATION AND MAINTENANCE OF VERIFIED DATA RECORDS

FIELD OF THE INVENTION

The present invention is generally related to systems and methods for providing convenient and reliable access to verified data.

BACKGROUND

With an increase in ability for users to publish information for public access via multiple channels, corroboration and verification of factual information can be a challenge. Existing systems may require a user to navigate multiple applications and perform numerous actions to corroborate information from various sources and data channels. Furthermore, execution of the electronic activities requires the user to be adept with various distinct functions and technology elements of a myriad applications in order to retrieve certain information. As such, verification of information is often time consuming. There is a need for an intelligent, proactive and responsive system that facilitates verification of information manner, and which is capable of adapting to the end user needs in order to provide accurate, relevant, and helpful information.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the present invention address present needs by providing a system for verification of data records via multi-channel inputs that is configured for intelligent, proactive and responsive communication with a user via a user device. The system is further configured to perform one or more user activities, in an integrated manner, within a single interface of the user device, without requiring the user to operate disparate applications. Furthermore, the system is configured to receive user input through multiple communication channels such as a textual communication channel and an audio communication channel and store unique user patterns to form an authentication baseline for subsequent user communications. The system is further configured to switch between the various communication channels seamlessly, and in real-time. In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention.

Embodiments of the invention relate to systems, computer implemented methods, and computer program products for establishing a system for generation of verified data records, the system comprising: at least one memory device with computer-readable program code stored thereon; at least one communication device; at least one processing device operatively coupled to the at least one memory device and the at least one communication device, wherein executing the computer-readable program code is configured to cause the at least one processing device to: receive, from one or more data channels and data sources, submission data; normalize the submission data to a textual format data; parse the textual format data to generate a parse syntax tree; analyze the parse syntax tree via use of a machine learning engine; identify, via the machine learning engine, one or more factual statements and modifiers within the parse syntax tree; compare the one or more factual statements and modifiers with additional data to determine a verification confidence record; and store the verification confidence record.

In some embodiments, the submission data is received from a mobile user device via a user application stored on the user device in the form of a web link, and the system is further configured to visit a web page associated with the web link and scrape textual data from the web page for further analysis.

In some embodiments, the submission data is in an auditory format, and normalizing the submission data further comprises using a speech-to-text algorithm to convert the submission data to textual format data.

In some embodiments, the verification confidence record further comprises a collection of multiple identified factual statements contained in the data submission and the system is further configured to assign a percentage confidence score to each of the multiple factual statements based on comparison to additional data.

In some embodiments, the verification confidence record further comprises a collection of one or more identified modifiers for each of the multiple identified factual statements, and wherein the system is further configured to identify a positive or negative bias percentage score for the one or more identified modifiers.

In some embodiments, the system is further configured to: alter a copy of the data submission to generate a verified data report, wherein altering the copy of the data submission comprises: highlighting the identified factual statements in a color, wherein the color corresponds to a range of percentage confidence scores; and highlighting the identified modifiers for each of the multiple identified factual statements in a color, wherein a different color is used to indicate the positive or negative bias percentage score.

In some embodiments, the system is further configured to: receive data from the user device indicating that the user has selected a highlighted portion of the verified data report; and in response to the data indicating that the user has selected the highlighted portion of the verified data report, transmit data to the user device causing the user device to display exact percentage data for the highlighted portion.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
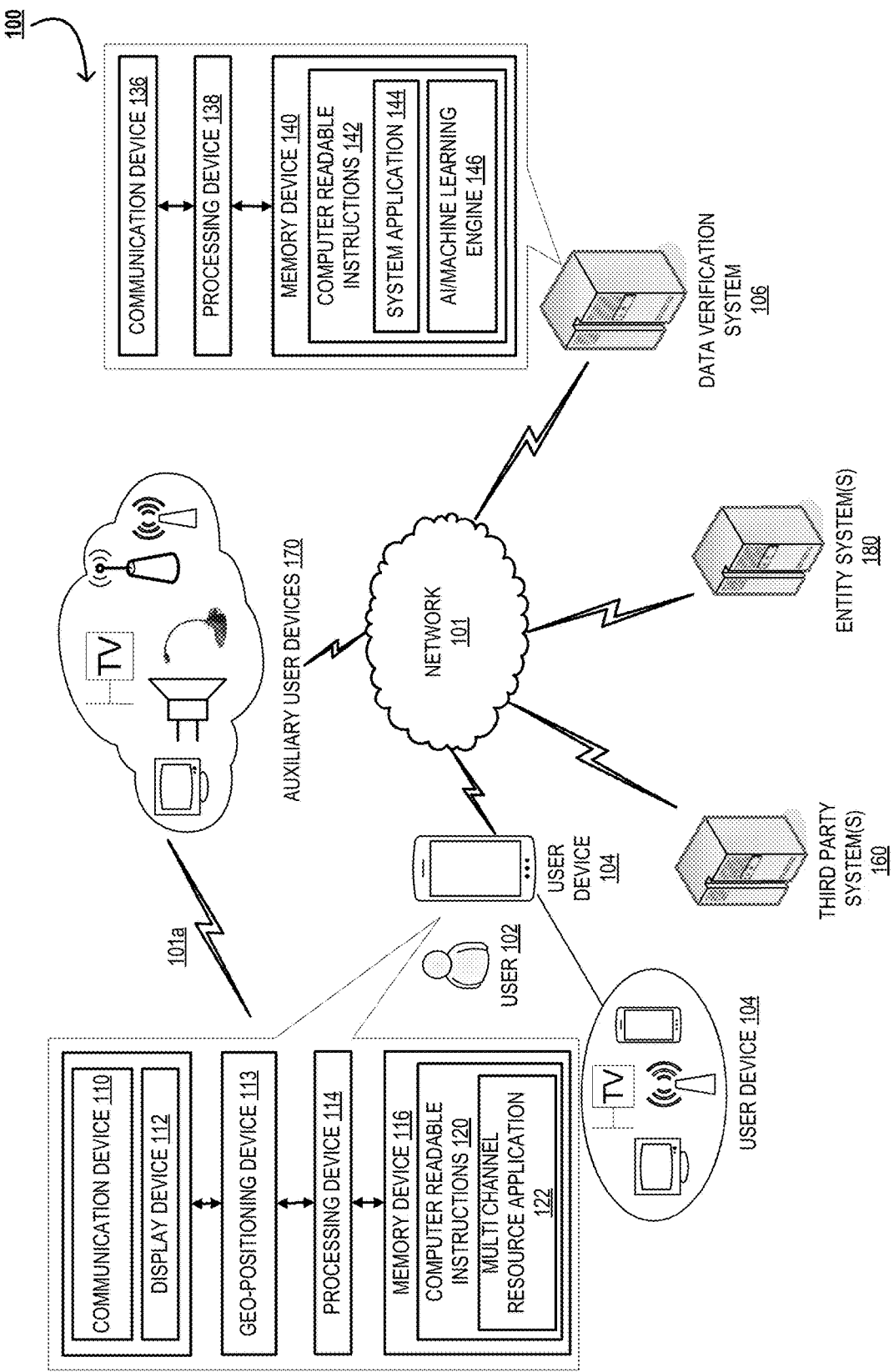
Figure 2:
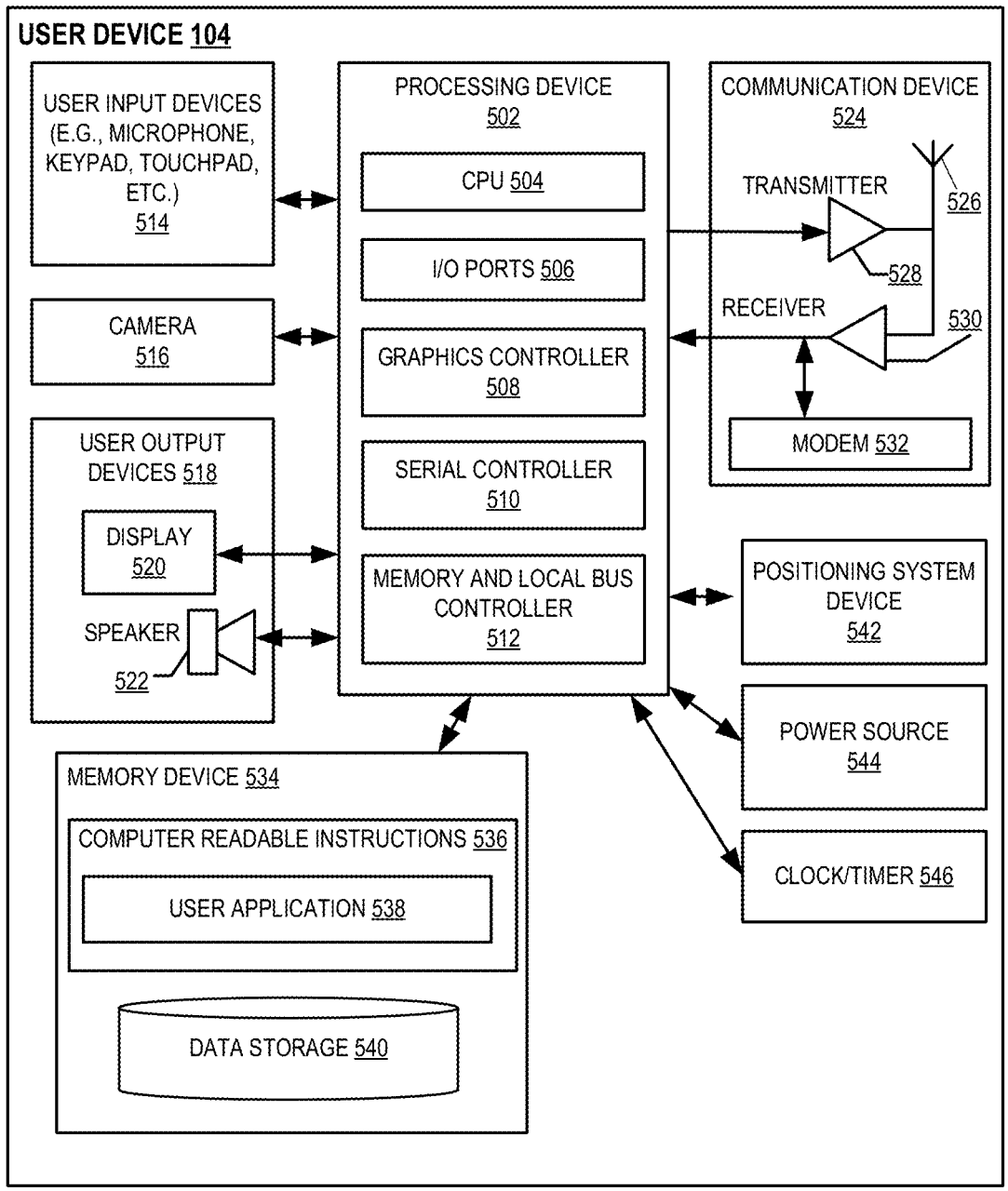
Figure 3:
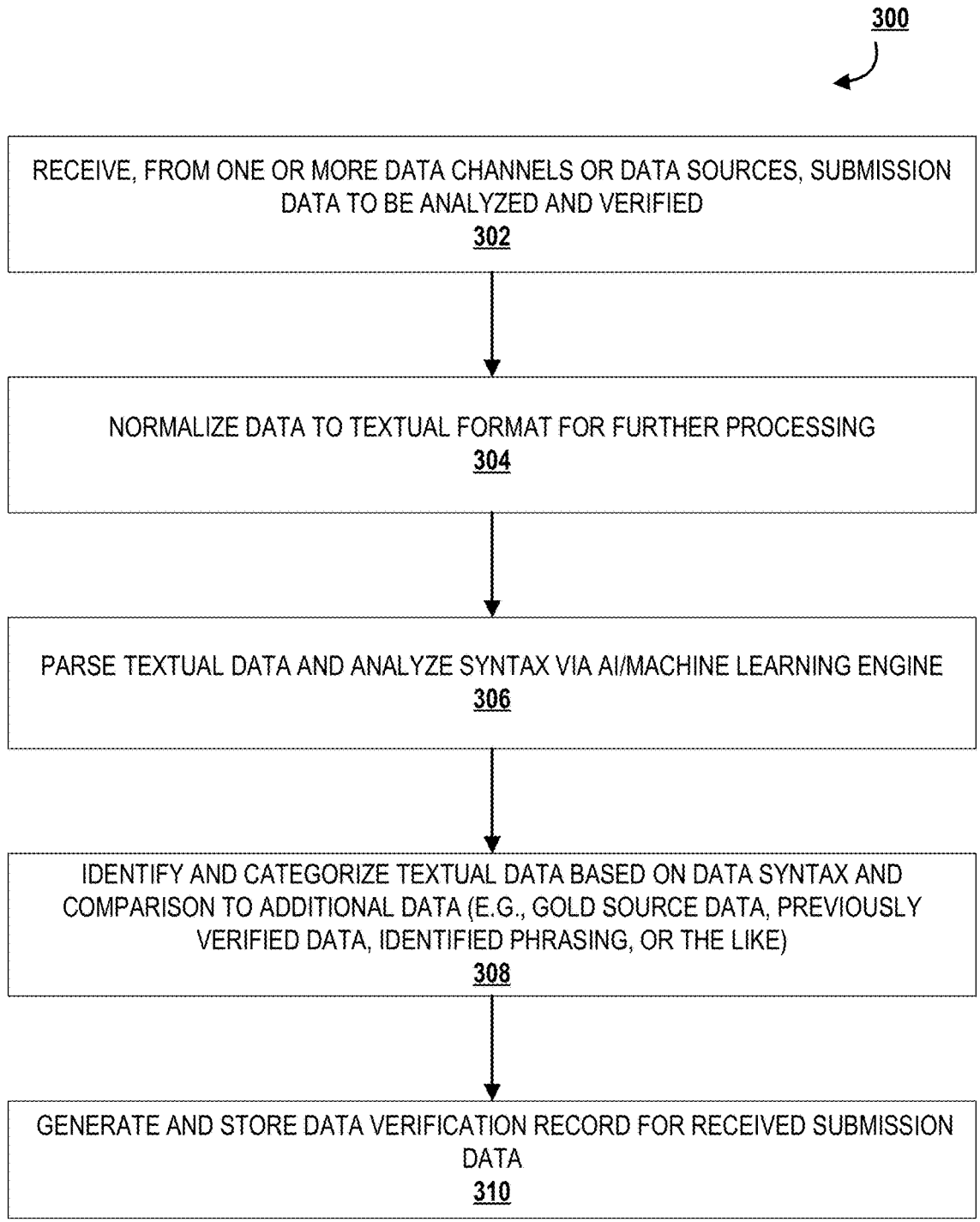
Figure 4:
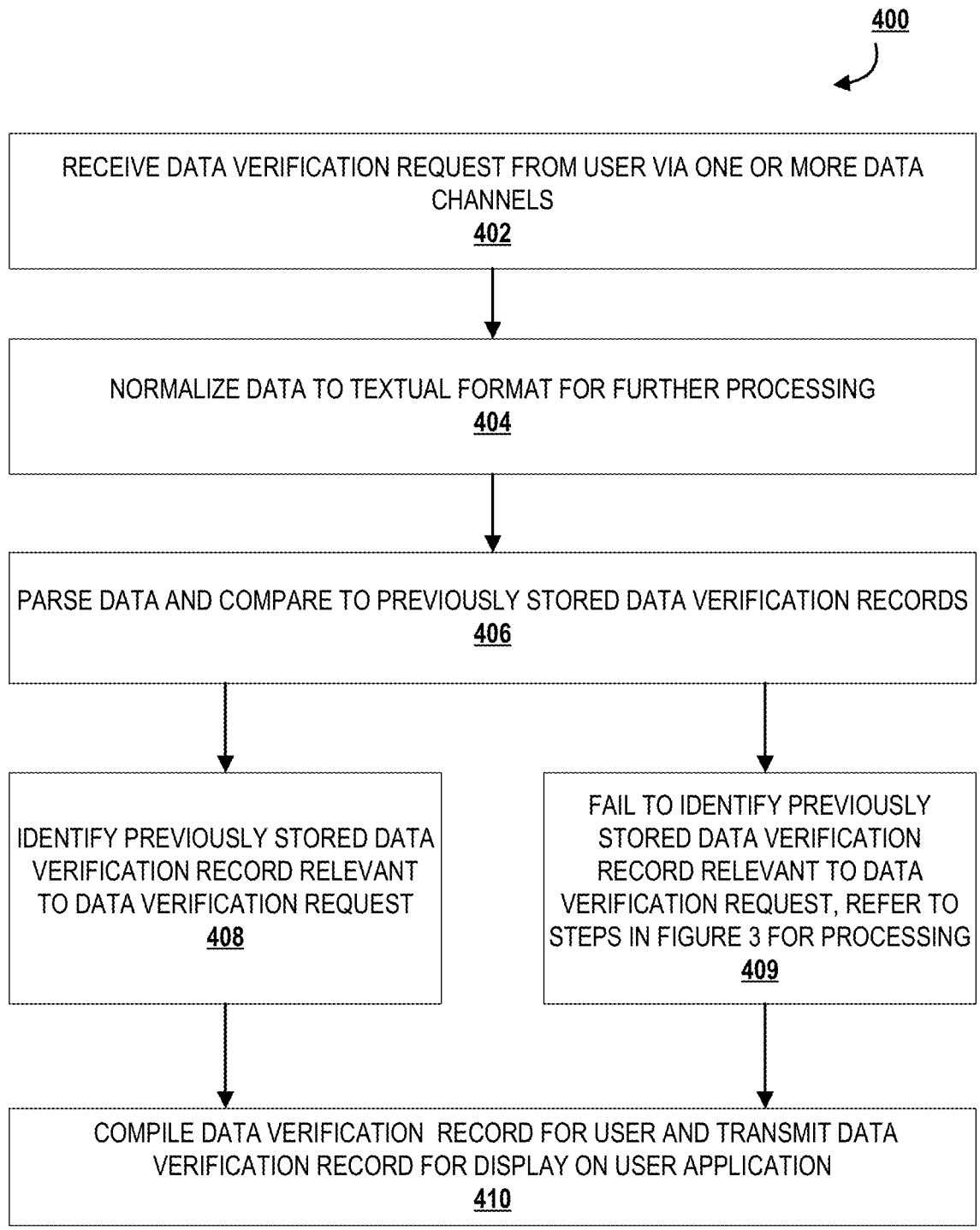

Having thus described embodiments of the invention in general terms, reference will now be made to the accompanying drawings, wherein:

FIG. 1 depicts a system environment 100 providing a system for multi-channel user input, in accordance with one embodiment of the present invention;

FIG. 2 provides a block diagram of the user device 104, in accordance with one embodiment of the present invention;

FIG. 3 depicts a high level process flow 300 of data record verification and classification 300, in accordance with embodiments of the present invention; and FIG. 4 illustrates a high-level process flow 400 for interaction with one or more users to complete a data verification request, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like. As used herein, a "third party" or "third party system" may be an entity that does not manage the data verification system, but provides data to or receives data from the data verification system or entity system that controls the data verification system. It is understood that one or more third party systems and entities are contemplated as communicating with the data verification system over a network.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In the instances where the entity is a resource entity or a merchant, financial institution or the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably.

An "account" may be established by the relationship that the user has with the entity. Examples of accounts include a deposit account, such as a transactional account (e.g. a banking account), a savings account, an investment account, a money market account, a time deposit, a demand deposit, a pre-paid account, a credit account, a non-monetary user configuration that includes personal information associated with the user, or the like. The account may typically be associated with and/or maintained by an entity, or associated with technology infrastructure such that the account or resources stored in the account may be accessed, modified or acted upon by the user electronically, for example using or transaction terminals, user devices, merchant systems, or the like. In some embodiments, the entity may provide one or more technology instruments or financial instruments to the user for executing resource transfer activities or financial transactions.

As used herein, a "user interface" may be a graphical user interface that facilitates communication using one or more communication mediums such as tactile communication (such, as communication via a touch screen, keyboard, or the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems or the like.

An electronic activity, also referred to as a "technology activity" or a "user activity", such as a "resource activity" or "transaction", may refer to any activities or communication between a user or entity and the financial institution, between the user and the entity, activities or communication between multiple entities, communication between technology applications or the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts (also referred to as "resources"), deposit of resources/funds into a financial account or resource (for example, depositing a check), withdrawal of resources or finds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more rewards or coupons to purchases, or any other interaction involving the user and/or the user's device that invokes or that is detectable by or associated with the financial institution. A resource activity may also include one or more of the following: renting, selling, and/or leasing goods and/or services (e.g., groceries, stamps, tickets, DVDs, vending machine items, or the like); making payments to creditors (e.g., paying monthly bills; paying federal, state, and/or local taxes; or the like); sending remittances; loading money onto stored value cards (SVCs) and/or prepaid cards; donating to charities; and/or the like. Unless specifically limited by the context, a "resource transfer," a "transaction," a "transaction event," or a "point of transaction event," refers to any user activity (financial or non-financial activity) initiated between a user and a resource entity (such as a merchant), between the user and the financial instruction, or any combination thereof.

In accordance with embodiments of the invention, the term "user" may refer to a merchant or the like, who utilizes an external apparatus such as a user device, for retrieving information related to the user's business that the entity may maintain or compile. Such information related to the user's business may be related to resource transfers or transactions that other users have completed using the entity systems. The external apparatus may be a user device (computing devices, mobile devices, smartphones, wearable devices, or the like). In some embodiments, the user may seek to perform one or more user activities using a multi-channel cognitive resource application of the invention, or user application, which is stored on a user device. In some embodiments, the user may perform a query by initiating a request for information from the entity using the user device to interface with the system for adjustment of resource allocation based on multi-channel inputs in order to obtain information relevant to the user's business.

In accordance with embodiments of the invention, the term "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

FIG. 1 depicts a platform environment 100 providing a system for verification of data records, in accordance with one embodiment of the present invention. As illustrated in FIG. 1, a data verification system 106, configured for providing an intelligent, proactive and responsive application or system, at a user device 104, which facilitates execution of electronic activities in an integrated manner, and which is capable of adapting to the user's natural communication and its various modes by allowing seamless switching between communication channels/mediums in real time or near real time. The data verification system is operatively coupled, via a network 101 to one or more user devices 104, auxiliary user devices 170, to entity systems 180, third party systems 160, and other external systems/ third-party servers not illustrated herein. In this way, the data verification system 106 can send information to and receive information from multiple user devices 104 and auxiliary user devices 170 to provide an integrated platform with multi-channel cognitive data analysis capabilities to a user 102, and particularly to the user device 104. At least a portion of the system for verification of data records may be configured to reside on the user device 104 (for example, at the user application 122), on the data verification system 106 (for example, at the system application 144), and/or on other devices and system. Furthermore, the system for verification of data records is capable of seamlessly adapting to and switch between the user's natural communication and its various modes (such as speech or audio communication, textual communication in the user's preferred natural language, gestures or the like), and may be infinitely customizable by the system 106 and/or the user 102 to receive and analyze data records in any language.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between devices, for example establishing a communication channel, automatically and in real time, between the one or more user devices 104 and one or more of the auxiliary user devices 170, (for example, based on reeving a user input, or when the user device 104 is within a predetermined proximity or broadcast range of the auxiliary devices 170), as illustrated by communication channel 101a. Therefore, the system, via the network 101 may establish, operative connections between devices, for example by establishing a communication channel 101a between the one or more user devices 104 and the auxiliary user devices 170. In this regard, the network 101 (and particularly the communication channels 101a) may take the form of contactless interfaces, short range wireless transmission technology, such near-field communication (NFC) technology, Bluetooth® low energy (BLE) communication, audio frequency (AF) waves, wireless personal area network, radio-frequency (RF) technology, and/or other suitable communication channels. Tapping may include physically tapping the external apparatus, such as the user device 104, against an appropriate portion of the auxiliary user device 170 or it may include only waving or holding the external apparatus near an appropriate portion of the auxiliary user device without making physical contact with the auxiliary user device.

In some embodiments, the user 102 is an individual that wishes to request or submit data from the data verification system 106 using the user device 104. In some embodiments, the user 102 may access the data verification system 106, and/or the entity system 180 through a user interface comprising a webpage or a user application. Hereinafter, "user application" is used to refer to an application on the user device 104 of the user 102, a widget, a webpage accessed through a browser, or the like. As such, in some instances, the user device may have multiple user applications stored/installed on the user device 104 and the memory device 116 in particular. In some embodiments, the user application is a user application 122, also referred to as a "user application" 122 herein, provided by and stored on the user device 104 by the data verification system 106. In some embodiments the user application 122 may refer to a third party application or a user application stored on a cloud used to access the data verification system 106 and/or the auxiliary user device 170 through the network 101, communicate with or receive and interpret signals from auxiliary user devices 170, or the like. In some embodiments, the user application is stored on the memory device 140 of the data verification system 106, and the user interface is presented on a display device of the user device 104, while in other embodiments, the user application is stored on the user device 104.

The user 102 may subsequently navigate through the interface or initiate one or more user activities or resource transfers using a central user interface provided by the user application 122 of the user device 104. In some embodiments, the user 102 may be routed to a particular destination or entity location using the user device 104. In some embodiments the auxiliary user device 170 requests and/or receives additional information from the data verification system 106/the resource entity system 160 and/or the user device 104 for authenticating the user and/or the user device, determining appropriate queues, executing information queries, and other functions. In other embodiments, the user application 122 may interface with one or more separate applications stored on the user device 104 such that it can receive and send data between applications in order to provide the user 102 with relevant information. For instance, the user 102 may utilize a web browsing application on the user device 104 to open a webpage in the user application 122 (e.g., the user wishes to verify the contents of an article, essay, or the like, and chooses to "open the webpage in" user application 122, or the like).

FIG. 1 also illustrates the user device 104. The user device 104, herein referring to one or more user devices, wherein each device may generally comprise a communication device 110, a display device 112, a geo-positioning device 113, a processing device 114, and a memory device 116. Typically, the user device 104 is a computing system that allows a user 102 to interact with other systems to initiate data record verification, or the like. The processing device 114 is operatively coupled to the communication device 110 and the memory device 116. The processing device 114 uses the communication device 110 to communicate with the network 101 and other devices on the network 101, such as, but not limited to the resource entity system 160, the auxiliary user device 170 and the data verification system 106. As such, the communication device 110 generally comprises a modem, server, or other device for communicating with other devices on the network 101. In some embodiments the network 101 comprises a network of distributed servers. In some embodiments, the processing device 114 may be further coupled to a display device 112, a geo-positioning device 113, and/or a transmitter/receiver device, not indicated in FIG. 1. The display device 112 may comprise a screen, a speaker, a vibrating device or other devices configured to provide information to the user. In some embodiments, the display device 112 provides a presentation of the central user interface of the integrated user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers or the like. In some embodiments the user device 104 may include authentication devices like fingerprint scanners, microphones or the like that are configured to receive bio-metric authentication credentials from the user.

The user device 104 comprises computer-readable instructions 120 stored in the memory device 116, which in one embodiment includes the computer-readable instructions 120 of the user application 122. In this way, users 102 may authenticate themselves, initiate data analysis, data requests, or the like, and interact with or receive and decode signals from the auxiliary user devices 170, communicate with the data verification system 106 to request or transmit information. The user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120 such as computer readable/executable code of the user application 122, when executed by the processing device 114 are configured to cause the user device 104 and/or processing device 114 to perform one or more steps described in this disclosure, or to cause other systems/devices to perform one or more steps described herein.

As further illustrated in FIG. 1, the data verification system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the resource entity systems 160, auxiliary user devices 170 and/or the user device 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the data verification system 106 comprises computer-readable instructions 142 or computer readable program code 142 stored in the memory device 140, which in one embodiment includes the computer-readable instructions 142 of a system application 144 (also referred to as a "system application" 144). The computer readable instructions 142, when executed by the processing device 138 are configured to cause the system 106/processing device 138 to perform one or more steps described in this disclosure to cause out systems/devices (such as the user device 104, the user application 122, or the like) to perform one or more steps described herein. Data verification system 106 also includes artificial intelligence (AI) and machine learning engine 146. In some embodiments, the AI and machine learning engine 146 is used to analyze received data in order to identify complex patterns and intelligently improve the efficiency and capability of the data verification system 106 to analyze received data and identify patterns. In some embodiments, the AI and machine learning engine 146 may included supervised learning techniques, unsupervised learning techniques, or a combination of multiple machine learning models that combine supervised and unsupervised learning techniques. In some embodiments, the machine learning engine may include an adversarial neural network that uses a process of encoding and decoding in order to adversarial train one or more machine learning models to identify relevant patterns in received data received from one or more channels of communication.

FIG. 1 further illustrates one or more auxiliary user devices 170, in communication with the network 101. The auxiliary user devices 170 may comprise peripheral devices such as speakers, microphones, smart speakers, or the like, display devices, a desktop personal computer, a mobile system, such as a cellular phone, smart phone, personal data assistant (PDA), laptop, wearable device, a smart TV, a smart speaker, a home automation hub, augmented/virtual reality devices, or the like.

In the embodiment illustrated in FIG. 1, and described throughout much of this specification, a "system" configured for performing one or more steps described herein refers to the user application 122, that may perform one or more user activities either alone or in conjunction with the data verification system 106, and specifically, the system application 144, one or more auxiliary user device 170, or the like.

The system for verification of data records, and the user application 122 in particular, are configured to function as an intelligent personal assistant and data navigator and are configured to perform one or more electronic user activities. In particular, the system is configured to present an integrated central user interface for communicating with the user via natural language or conversation channels, for requesting and transmitting authentication information, and for integrating the functionality of multiple applications in a single interface without requiring the user to access the multiple applications individually and be proficient in their operation. In addition, the system may store identification and authentication information for future use to expedite the completion of subsequent activities. In some instances, after initial authorization or authentication of a user during an initial activity, the system may authenticate the user by using alternate authentication techniques during the completion of subsequent activities.

As such, the user application 122 is configured to perform one or more user activities in a convenient manner, via a central user interface of the application 122. In this regard, in some embodiments, the central user interface is presented on one or more user devices via the user application 122 or another user application 122. The central user interface associated with the user application 122 may be presented on the display device 112 of the user device 104 in response to receiving an indication from the user (for example, receiving a voice command from the user with an identifier, receiving a tactile indication or a fingerprint authentication from the user device 104, facial recognition information from the user device 104, and other authentication credentials, or the like), automatically in response to detecting an action trigger (for example, determining that the user is attempting to perform an activity by using a particular application or additional device, such as auxiliary user device 170, or the like). Additionally, the user application 122 may be configured to proactively alert the user of information analyzed and compiled by the data verification system 106 and entity systems 180. This information may include information related to other users that interact with the data verification system 106 if the resource transaction information is identified as being relevant and potentially useful to the user 102.

Typically, the central user interface is a computer human interface, and specifically a natural language/conversation user interface provided by the data verification system 106 to the user 102 via the user device 104 or auxiliary user device 170. The various user devices receive and transmit user input to the entity systems 180 and data verification system 106. The user device 104 and auxiliary user devices 170 may also be used for presenting information regarding user activities, providing output to the user 102, and otherwise communicating with the user 102 in a natural language of the user 102, via suitable communication mediums such as audio, textual, or the like. The natural language of the user comprises linguistic variables such as words, phrases and clauses that are associated with the natural language of the user 102. The system is configured to receive, recognize and interpret these linguistic variables of the user input and perform user activities and resource activities accordingly. In this regard, the system is configured for natural language processing and computational linguistics. In many instances, the system is intuitive, and is configured to anticipate user requirements, data required for a particular activity or the like, and request data from the user 102 accordingly.

Also pictured in FIG. 1 are one or more third party systems 160, which are operatively connected to the data verification system 106 via network 101 in order to transmit data associated with user activities, user authentication, user verification, resource actions, or the like. For instance, the capabilities of the data verification system 106 may be leveraged in some embodiments by third party systems in order to authenticate user actions based on data provided by the third party systems 160, third party applications running on the user device 104 or auxiliary user devices 170, as analyzed and compared to data stored by the data verification system 106, such as data stored at entity systems 180. In some embodiments, the multi-channel data processing capabilities may be provided as a service by the data verification system 106 to the entity systems 180, third party systems 160, or additional systems and servers not pictured, through the use of an application programming interface ("API") designed to simplify the communication protocol for client-side requests for data or services from the data verification system 106. In this way, the capabilities offered by the present invention may be leveraged by multiple parties other than the those controlling the data verification system 106 or entity systems 180.

FIG. 2 provides a block diagram of the user device 104, in accordance with one embodiment of the invention. The user device 104 may generally include a processing device or processor 502 communicably coupled to devices such as, a memory device 534, user output devices 518 (for example, a user display device 520, or a speaker 522), user input devices 514 (such as a microphone, keypad, touchpad, touch screen, or the like), a communication device or network interface device 524, a power source 544, a clock or other timer 546, a visual capture device such as a camera 516, a positioning system device 542, such as a geo-positioning system device like a GPS device, an accelerometer, or the like. The processing device 502 may further include a central processing unit 504, input/output (I/O) port controllers 506, a graphics controller or graphics processing device (GPU) 208, a serial bus controller 510 and a memory and local bus controller 512.

The processing device 502 may include functionality to operate one or more software programs or applications, which may be stored in the memory device 534. For example, the processing device 502 may be capable of operating applications such as the multi-channel resource application 122. The multi-channel resource application 122 may then allow the user device 104 to transmit and receive data and instructions from the other devices and systems of the environment 100. The user device 104 comprises computer-readable instructions 536 and data storage 540 stored in the memory device 534, which in one embodiment includes the computer-readable instructions 536 of a multi-channel resource application 122. In some embodiments, the multi-channel resource application 122 allows a user 102 to access and/or interact with other systems such as the entity system 180, third party system 160, or data verification system 106. In one embodiment, the user 102 is a maintaining entity of a data verification system 106, wherein the user application enables the user 102 to define policies and reconfigure the data verification system 106 or its components. In one embodiment, the user 102 is a customer of a financial entity and the multi-channel resource application 122 is an online banking application providing access to the entity system 180 wherein the user may interact with a resource account via a user interface of the multi-channel resource application 122, wherein the user interactions may be provided in a data stream as an input via multiple channels. In some embodiments, the user 102 may a customer of third party system 160 that requires the use or capabilities of the data verification system 106 for authorization or verification purposes.

The processing device 502 may be configured to use the communication device 524 to communicate with one or more other devices on a network 101 such as, but not limited to the entity system 180 and the data verification system 106. In this regard, the communication device 524 may include an antenna 526 operatively coupled to a transmitter 528 and a receiver 530 (together a "transceiver"), modem 532. The processing device 502 may be configured to provide signals to and receive signals from the transmitter 528 and receiver 530, respectively. The signals may include signaling information in accordance with the air interface standard of the applicable BLE standard, cellular system of the wireless telephone network or the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance, audio frequency, ultrasound frequency, or other communication/data networks.

The user device 104 may also include a memory buffer, cache memory or temporary memory device operatively coupled to the processing device 502. Typically, one or more applications, are loaded into the temporarily memory during use. As used herein, memory may include any computer readable medium configured to store data, code, or other information. The memory device 534 may include volatile memory, such as volatile Random Access Memory (RAM) including a cache area for the temporary storage of data. The memory device 534 may also include non-volatile memory, which can be embedded and/or may be removable. The non-volatile memory may additionally or alternatively include an electrically erasable programmable read-only memory (EEPROM), flash memory or the like.

Though not shown in detail, it is understood that the system further includes one or more entity systems 180 which is connected to the user device 104 and the data verification system 106 and which may be associated with one or more entities, institutions, third party systems 160, or the like. In this way, while only one entity system 180 is illustrated in FIG. 1, it is understood that multiple networked systems may make up the system environment 100. The entity system 180 generally comprises a communication device, a processing device, and a memory device. The entity system 180 comprises computer-readable instructions stored in the memory device, which in one embodiment includes the computer-readable instructions of an entity application. The entity system 180 may communicate with the user device 104 and the data verification system 106 to provide access to user accounts stored and maintained on the entity system 180. In some embodiments, the entity system 180 may communicate with the data verification system 106 during an interaction with a user 102 in real-time, wherein user interactions may be monitored and processed by the data verification system 106 in order to analyze interactions with the user 102 and reconfigure the machine learning model in response to changes in a received or monitored data stream. In one embodiment, the system is configured to receive data for decisioning, wherein the received data is processed and analyzed by the machine learning model to determine a conclusion.

FIG. 3 depicts a high level process flow of data record verification and classification 300, in accordance with embodiments of the present invention. As shown, the process begins at block 302 wherein the data verification system 106 receives submission data to be analyzed and verified. As discussed, the system is designed to send data to and receive data from multiple sources and via multiple channels for any given source, such as one or more user devices, third party systems, entity systems, or the like. For instance, the data submission may be transmitted via email, web form submission, via a user application on a user device, via text message, via voice data, or the like.

As such, the system is designed to normalize the data to textual format for further processing, as shown in block 304. In some embodiments where the data submission is received in a non-text format, such as an audio format, the data submission may be processed and transcribed to textual format (e.g., the data submission may be forwarded to a human user for manual transcription, the data submission may be transcribed using a voice to text or audio to text software, or the like). In embodiments involving the use of automated transcription software, one or more AI or machine learning engines, such as the AI/machine learning engine 146, may be used to conduct audio frequency analysis of audio files in order to identify corresponding words in a speech-to-text library stored on the data verification system, or stored in one or more other systems (e.g., cloud-based transcription services). In other embodiments, the data submission may be a link to a webpage that contains an article or textual information. In these instances, the system may employ the use of a data crawler to scrape web pages or other data sources for relevant data. Again, this may involve use of an AI/machine learning engine in order to identify the location of relevant text information on the data submission (e.g., a machine learning engine may be trained to scrape data from a webpage based on training data representing a number of web page formats wherein article "body" text is identified and exported to a separate text file, or the like). In some embodiments, the data submission may be in a textual format, but may be required to be converted to a plaintext format or other text format for further analysis by the system. In any embodiment, the final textual information is normalized to for analysis in a standard format by the data verification system 106 (e.g., rich text format, plain text format, any word processing software proprietary format, or the like).

As shown in block 306, the process continues wherein the system parses the normalized textual data and analyzes the syntax of the text via the AI/machine learning engine 146. In this way, the system may identify and classify certain words, syllables, phrases, terminology, or the like in order allow for granular processing and contextualized processing. To accomplish this, some embodiments of the invention may include the use of multiple machine learning models or an ensemble of machine learning models in order to fully process the textual data. For instance, a machine learning model may be trained to specifically identify grammatical categorizations and phrasing, such as a supervised machine learning process wherein a model is trained to identify, nouns, verbs, adjectives, pronouns, adverbs, conjunctions, tense, or the like. In some embodiments, the same model or an additional model may be used to analyze and identify phrasing, tone, or the like based on the syntax of a particular sentence as a whole, or the context in which a particular phrase, terms or sentence appears. In this way, a machine learning model may be programmed or trained in order to identify rhetorical phrasing or "spin" and separate or highlight such phrasing from factual information verified by matching the factual data to other sources.

As such, the process proceeds to block 308, wherein the system identifies and categorizes the textual data and may leverage other data sources in doing so. For instance, the system may have parsed a specific sentence into key components via the use of a parse tree. The system may generate a parse tree based on the detected words and phrases in the data submission. The parse tree may indicate the language structure of a statement or sentence, and may indicate a verb and infinitive combination of a subject, object, or topic, with a particular modifier. In some instances, the system may cross-reference the data submission with other data sources determined to be related as including the same subject, object, or topic. In some embodiments, the frequency of the occurrence or reference to a particular object, subject, or topic may be used to determine relevance of other data sources (e.g., topic 1 appears 10 times within a particular 100 word article). In other embodiments, specific areas of a data submission, such as a title of an article or subtitles within an article may be identified and weighted differently in terms of determine an overall relevance score (e.g., topic 1 appears only 5 times within a particular 500 word article, but appears in the title, so the system weights the particular article as highly relevant to topic 1).

The system may then analyze the parse tree to determine the intent or "spin" of the data submission as evidenced by object or topic modifiers present in the data submission. For example, based on the parse tree, the system may determine that a particular factual subject is discussed in either a positive or negative manner within the data submission. As an example, the sentence "let the dog chase the cat" may be determined to include the topic of "dog chase cat" by virtue of identifying and parsing the nouns, verbs, clauses, and phrases within the particular sentence. However, the system may include a machine learning engine to decipher between this reported fact and text which includes "spin" modifiers. For instance, the sentence may read "playfully let the dog chase the cat," wherein "playfully" may learned over time by the system machine learning model as indicating positive sentiment (e.g., either by supervised learning techniques, unsupervised contextual analysis of bulk data, or the like). In alternative scenarios, the sentence may read "carelessly let the dog chase the cat," wherein "carelessly" may learned over time by the system machine learning model as indicating negative sentiment (e.g., either by supervised learning techniques, unsupervised contextual analysis of bulk data, or the like).

This process may be repeatedly expanded upon to include meta-analysis of particular data sources. For instance, the system may be tasked with analyzing the spin of a particular topic as indicated by a multitude of articles published by the same news outlet or various news outlets (e.g., traditional news media sources such as newspapers and new stations, blogs, academic research articles, social media posts, or the like), and may determine that the topic frequently appears to be modified using negative spin by the data source. In other embodiments, the system may identify patterned variations within the same data source, such as frequent use of biased modifiers to describe a specific factual topic by a particular author, quoted expert, or the like. As such, the system may flag the data source or individual author, primary source, or the like as potentially biased with regard to the topic, and may separate the positive or negative modifiers from the factual topic in order to highlight this observation. The system may also determine a confidence score by identifying a high degree of repetition of strictly factual information between one or more data sources. For instance, multiple data sources may be analyzed to highlight and parse factual information of "dog chase cat" with spin or bias modifiers removed. In this instance, the system would determine a high likelihood that the dog chased the cat, despite the fact that some data sources reported this negatively and others reported it positively. In other instances, factual information may be given a high confidence score automatically by virtue of corroboration by a particular data source, or "gold source." In this instance, the gold source may be a vetted source of information that is trusted by the system as containing verified, peer reviewed, or otherwise trustworthy factual information (e.g., an encyclopedia, a peer reviewed data hub, or the like).

As shown in block 310, once the data submission has been fully analyzed, the system may generate and store a data verification record for the received data submission. Depending on the embodiment of the invention, the verification record may include raw data on the results of the analysis that can be used to generate a report for users and entities accessing the data verification system. For instance, the data verification record may include metadata for the data scraping and normalization techniques, parse trees for each sentence, paragraph, submission or the like, likelihood scores for bias analysis, data sources used for corroboration or comparison, confidence score for each fact identified, or the like.

FIG. 4 illustrates a high-level process flow 300 for interaction with one or more users to complete a data verification request, in accordance with embodiments of the present invention. Although, the high-level process flow 300 is described with respect to receiving data from the one or more users via a user mobile device channel, it is understood that the process flow is applicable to a variety of other user devices or channels of communication, such as a voice controlled smart home device. Furthermore, one or more steps described herein may be performed by the user mobile device 104, user application 122, and/or the data verification system 106. The user application 122 stored on a user mobile device, is typically configured to launch, control, modify and operate applications stored on the mobile device. In this regard, the user application 122 facilitates the user 102 to perform a data verification activity, such as submit an article, link, or other information, or the like for analysis and verification. In some embodiments, the user application 122 is a mobile application managed by the entity systems 180 that the user interacts with in order to manage one or more existing resource accounts maintained by the entity systems 180, such as a "mobile banking application," or the like. In other embodiments, the user application 122 may be a standalone application that solely offers the functionality of providing data verification to the user, or the like. In further embodiments, the user application 122 may be a "voice assistant" or "mobile assistant" application geared toward the providing of a wide range of available information, with in-depth data verification only being one service provided by the assistant environment, or the like. In some embodiments, the user application 122 may include a search bar, text field, or the like, where the user may input text or choose to submit a link, article, topic, alleged fact, or the like, or the user may dictate information via a connected or embedded microphone on the user device 104. In other embodiments, the user may submit a data verification request via one or more auxiliary devices 170, such as a smart home device, or the like, which can interface with the user application 122 stored on the user device 104, or may have a separate user application stored locally such that the smart home device may transmit and receive information directly from the data verification system 106.

In some embodiments, the data verification system 160 is configured to conduct, via the central user interface of one or more user devices, a conversation with the user. As discussed previously, the central user interface is a computer human interface, and specifically a natural language/conversation user interface for receiving user input (for example, for creating, selecting and modifying data/functionality), presenting information regarding user activities, providing output to the user, and otherwise communicating with the user in a natural language of the user, via suitable communication mediums such as audio, textual, or the like. A "conversation" as referred to herein may comprise receiving a user input using a suitable communication channel/medium, providing an output to the user using a suitable communication channel/medium, a dialog or interchange comprising receiving one or more user input and providing relevant one or more outputs, or the like. Typically, the conversation components, i.e., the user input received and the output provided by the multi-channel resource application are in the natural language of the user, often comprising linguistic variables such as verbs, phrases and clauses, or the like. As such, the system is configured for natural language communication across multiple communication channels (such as, speech/audio, text, or the like), and is configured to switch between them seamlessly and in real-time, during the conversation.

Conducting the conversation with the user comprises receiving, via the central user interface, an activity input or user input from the user regarding initiation of a user activity, wherein the activity input is received through a first communication medium. For example, the system is configured for communication using an audio communication medium, via an audio communication channel. In this regard, the system may receive the user activity input in the form of voice input having natural speech (for example, sentences, phrases, or the like) of the user, captured using a communication device of the user device such as a microphone. Similarly, the system is configured communication using a for textual communication medium, via a textual communication channel. Here, the user may provide user input by entering text in a natural language of the user, using a user input device such as a keypad or the display screen of the device itself. In some instances, in response to receiving the activity input, the system is configured to present the received activity input on the central user interface.

For example, the system may transform/convert the received audio input into a textual form and initiate a presentation of the transformed input on the central user interface. Similarly, the system may present the received textual input on the central user interface. In this way, the system may construct a conversation log on the central user interface comprising the received activity input from the user and output provided by the system. In response to receiving the activity input from the user, such as an audio input or textual input from the user, the system may provide output to the user in an audio form, in a visual/textual form, or both. Therefore, the present invention is extremely beneficial for users who are hearing impaired or visually impaired. In addition, the present invention provides added convenience for all users by allowing the initiation and completion of user activities that require authentication and verification of user identity by providing multiple possible avenues for communication of necessary information through various channels. Based on receiving the activity input from the user, in some embodiments, the system is configured to generate a parse tree based on detected one or more words and/or the detected keywords.

The system is configured to provide a multi-channel resource application or user application 122 on a user device 104 associated with the user 102. Providing the application may comprise transmitting, installing, storing, initiating and/or opening the user application 122 on the user device 104. The user application 122 is further configured to present a central user interface on a display device 112 of the user device 104. In some instances, the user device 104 is configured to present the user application 122, and the central user interface based on receiving control instructions from the data verification system 106. In some instances, the user application 122 may be running in the background on the user device, and the control instructions may cause the user application 122 stored on the user device 104 to present the central user interface or an alert on the display of the user device, automatically.

In some embodiments, prior to initiating the presentation of the central user interface or alert, the system may modify an existing display to allow the user to choose to, or prevent the user application from opening. The modification of the existing displays may comprise locking the screen for a predetermined period of time (such as 10 seconds) or until the user acquiesces the opening of the application by user voice, touch, or gesture commands. In addition, the system may also dim the brightness of the existing display for a predetermined period of time (such as 10 seconds) or until the user acquiesces the opening of the application by user voice, touch, or gesture commands, thereby reducing power requirements and drawing the user's attention. In some embodiments, based on determining that the user device 104 does not comprise a user application 122, the system may transmit control instructions that cause the user device and/or facilitate the user to download and install the user application 122. In some embodiments, the central user interface of the user application 122 is similar to the interfaces illustrated and described with respect to FIG. 3 and later on in this disclosure In this regard, in some embodiments, the system may initialize the user application 122 or cause presentation of the central user interface based on determining that the user seeks to initiate the submission of data for verification. In this regard, the system and/or the user device may identify that the user seeks to initiate a submission of data for verification based on analyzing data associated with the user's business, based on analyzing user financial information, based on analyzing user social media feeds, and/or based on receiving user input provided using user input devices of the user mobile device or receiving input provided by the entity system. In some instances, the mobile device may determine that the user 102 seeks to initiate verification of data submission based on determining that the user is currently located in a resource entity or merchant facility, and specifically located near a transaction terminal or user activity interface device.

As such, the process in FIG. 4 begins at block 402, wherein the system receives a data submission to be analyzed and verified, which may be received from one or more of the data channels described herein. The data submission is normalized to a standard textual format for further processing by the system, as shown in block 404. As discussed in FIG. 3, this process may differ depending on the original format of the data submission (e.g., an audio submission may require speech-to-text conversion, while a link to an article may require the use of a data crawler to gather article text, or the like).

Next, the system parses the data submission to identify and categorize the contents of the data submission. Based on the identified contents of the submission (topics, modifiers, data source, or the like), the system may handle the data submission in various manners, or a combination of manners, as shown in blocks 408 and 409. As depicted in block 408, the system may identify previously stored data verification records relevant to the data verification request (e.g., a link submitted by the user contains an article already processed and analyzed by the system, or the like). In other embodiments, the data submission may be a standalone fact that requires verification, in which the system may quickly refer to gold source data sources or corroborating data sources to determine a confidence score. In other embodiments, a portion or all of the data submission may contain factual information or modifier information that cannot be verified by existing data verification records, in which case the process would proceed to block 409, wherein the system fails to identified previously stored data verification records relevant to the data submission, and refers to the process described in FIG. 3 for further processing and generation of data verification records.

As shown in block 410, the process 400 concludes by compiling information from the data verification records for the user and transmitting the data verifications for display on the user application via a user device, or the like. In some embodiments, the transmitted data may be in the form of a simplified data report, wherein the system generates a report listing the factual information that was able to be extracted and verified or corroborated by the system. In other embodiments, the report might contain additional information related to the modifiers, perceived bias, breakdown of different modifiers among data sources (e.g., source 1 80% negative sentiment, source 2 60% positive sentiment, or the like), confidence score (e.g., 98% confidence of factual verification per each topic, fact, or data submission as a whole, or the like). In other embodiments, where the original data submission is an article or published text document, the report may comprise a graphical overlay depicting various information in an interactive manner. For instance, the report may be displayed via the graphical user interface of the user device via the user application to include highlighted portions color coded based on verification analysis results. For instance, information with a relatively high degree of factual corroboration from trusted sources (e.g., some percentage as set by the managing user of the data verification system, such as a 98% corroboration of majority of trusted sources, a 60% corroboration among all sources, or the like) may be highlighted in green, whereas factual statements that are contradicted by trusted sources might appear in red, and factual statements that cannot be corroborated or verified may be highlighted in yellow. It is understood that the threshold percentage ranges for "high likelihood" or the like may be tailored to fit the preferences of the entity managing the data verification system, or in other embodiments may be dictated by statistical probabilities accepted in peer review circles, or may be determined by the results of supervised or unsupervised machine learning techniques. The examples provided herein are understood as simply embodiments to explain that differentiation between verification results may be graphically overlaid in a manner that easily conveys the confidence in factual information to the user.

In other embodiments, the report may include graphical representation in a similar manner for identified bias or modifiers, which may be further categorized or colorized in any number of combinations to convey that certain words, phrases, statements, or the like in the data submission have been identified with positive or negative sentiment. In other embodiments, positive or negative sentiment may be inferred or cautioned by inclusion of the data source statistics in the report (e.g., the system may highlight the author of a particular data submission as being associated with negative bias or "spin" toward a particular topic included in the data submission). In any embodiment, the report may include an interactive component wherein the user may tap or click areas of the report to access additional information. For instance, the user may tap a green highlighted factual statement and the system may respond by transmitting instructions to overlay a graphical window describing the sources and verification percentages relied upon in verifying the data, along with a date, time, or the like in order to provide reference of the corroboration during later reviews.

In some embodiments, the report may be transmitted over any number of channels instead of or in addition to presenting it via the user application, such as in an emailed document, texted document, cloud hosted document, or interactive document accessed via a secure web portal to those authorized to access the data verification system and services (e.g., software as a service web portal may be used to transmit information to the end user). In other embodiments, the system may generate and store a user configuration for the user wherein past reports may be saved and referenced at a later time. In still further embodiments, the system may include batch processing functionality, wherein multiple data submissions can be received at one time, and the associated reports may be transmitted back to the user in a batch of documents, in which the batch of data submissions may be cross referenced or ranked based on verification results, or the like. In some embodiments, previously delivered reports may be organized in the user application according to a number of data characteristics (e.g., sort by "highest confidence score," sort by "newest first," or the like).

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
|---|---|---|---|
| 9758US1.014033.3726 | To be assigned | SECURE DATA TRANSFER SYSTEM WITH INTEGRATED PROXY GATEWAY | Concurrently herewith |

The invention claimed is:

1. A system for generation of verified data records, the system comprising:
- at least one memory device with computer-readable program code stored thereon;
- at least one communication device;
- at least one processing device operatively coupled to the at least one memory device and the at least one communication device, wherein executing the computer-readable program code is configured to cause the at least one processing device to:
    - receive submission data;
    - normalize the submission data to a textual format data;
    - parse the textual format data to generate a parse syntax tree;
    - analyze the parse syntax tree via use of a machine learning engine;
    - identify, via the machine learning engine, one or more factual statements and modifiers within the parse syntax tree;
    - compare the one or more factual statements and modifiers with additional data to determine a verification confidence record; and
    - store the verification confidence record, wherein the verification confidence record further comprises a collection of multiple identified factual statements contained in the data submission and the system is further configured to assign a percentage confidence score to each of the multiple factual statements based on comparison to additional data.

2. The system of claim 1, wherein the submission data is received from a user device via a user application stored on the user device in the form of a web link, and the system is further configured to visit a web page associated with the web link and scrape textual data from the web page for further analysis.

3. The system of claim 1, wherein the submission data is in an auditory format, and normalizing the submission data further comprises using a speech-to-text algorithm to convert the submission data to textual format data.

4. The system of claim 1, wherein the verification confidence record further comprises a collection of one or more identified modifiers for each of the multiple identified factual statements, and wherein the system is further configured to identify a positive or negative bias percentage score for the one or more identified modifiers.

5. The system of claim 4, further configured to:
- alter a copy of the data submission to generate a verified data report, wherein altering the copy of the data submission comprises:
    - highlighting the identified factual statements in a color, wherein the color corresponds to a range of percentage confidence scores; and
    - highlighting the identified modifiers for each of the multiple identified factual statements in a color, wherein a different color is used to indicate the positive or negative bias percentage score.

6. The system of claim 5, wherein the system is further configured to:
- receive data from a user device indicating that a user has selected a highlighted portion of the verified data report; and
- in response to the data indicating that the user has selected the highlighted portion of the verified data report, transmit data to the user device causing the user device to display exact percentage data for the highlighted portion.

7. A computer program product for generation of verified data records, the computer program product comprising a non-transitory computer-readable storage medium having computer-executable instructions to:
- receive submission data;
- normalize the submission data to a textual format data;
- parse the textual format data to generate a parse syntax tree;
- analyze the parse syntax tree via use of a machine learning engine;
- identify, via the machine learning engine, one or more factual statements and modifiers within the parse syntax tree;
- compare the one or more factual statements and modifiers with additional data to determine a verification confidence record; and
- store the verification confidence record, wherein the verification confidence record further comprises a collection of multiple identified factual statements contained in the data submission and the system is further configured to assign a percentage confidence score to each of the multiple factual statements based on comparison to additional data.

8. The computer program product of claim 7, wherein the submission data is received from a user device via a user application stored on the user device, the submission comprising a web link, and wherein the system is further configured to:
- visit a web page associated with the web link; and
- scrape textual data from the web page.

9. The computer program product of claim 7, wherein the submission data is in an auditory format, and normalizing the submission data further comprises using a speech-to-text algorithm to convert the submission data to textual format data.

10. The computer program product of claim 7, wherein the verification confidence record further comprises a collection of one or more identified modifiers for each of the multiple identified factual statements, and wherein the system is further configured to identify a positive or negative bias percentage score for the one or more identified modifiers.

11. The computer program product of claim 10, further configured to:
- alter a copy of the data submission to generate a verified data report, wherein altering the copy of the data submission comprises:

highlighting the identified factual statements in a color, wherein the color corresponds to a range of percentage confidence scores; and highlighting the identified modifiers for each of the multiple identified factual statements in a color, wherein a different color is used to indicate the positive or negative bias percentage score.

12. The computer program product of claim 11, wherein the system is further configured to:

receive data from a user device indicating that a user has selected a highlighted portion of the verified data report; and in response to the data indicating that the user has selected the highlighted portion of the verified data report, transmit data to the user device causing the user device to display exact percentage data for the highlighted portion.

13. A computer implemented method for generation of verified data records, the computer implemented method comprising:

receiving submission data;

normalizing the submission data to a textual format data;

parsing the textual format data to generate a parse syntax tree;

analyzing the parse syntax tree via use of a machine learning engine;

identifying, via the machine learning engine, one or more factual statements and modifiers within the parse syntax tree;

comparing the one or more factual statements and modifiers with additional data to determine a verification confidence record; and storing the verification confidence record, wherein the verification confidence record further comprises a collection of multiple identified factual statements contained in the data submission and the system is further configured to assign a percentage confidence score to each of the multiple factual statements based on comparison to additional data.

14. The computer implemented method of claim 13, wherein the submission data is received from a user device via a user application stored on the user device, and the submission data comprises a web link, and wherein the system is further configured to:

visit a web page associated with the web link; and scrape textual data from the web page.

15. The computer implemented method of claim 13, wherein the submission data is in an auditory format, and normalizing the submission data further comprises using a speech-to-text algorithm to convert the submission data to textual format data.

16. The computer implemented method of claim 13, wherein the verification confidence record further comprises a collection of one or more identified modifiers for each of the multiple identified factual statements, and wherein the system is further configured to identify a positive or negative bias percentage score for the one or more identified modifiers.

17. The computer implemented method of claim 16, further configured to:

alter a copy of the data submission to generate a verified data report, wherein altering the copy of the data submission comprises:

highlighting the identified factual statements in a color, wherein the color corresponds to a range of percentage confidence scores; and highlighting the identified modifiers for each of the multiple identified factual statements in a color, wherein a different color is used to indicate the positive or negative bias percentage score.

* * * * *